United States Patent [19]
Huang

[11] Patent Number: 5,432,643
[45] Date of Patent: Jul. 11, 1995

[54] AUXILIARY MIRROR ASSEMBLY FOR REAR VIEW MIRROR

[76] Inventor: Chi S. Huang, P.O. Box 1032, Tainan, Taiwan

[21] Appl. No.: 287,518

[22] Filed: Aug. 8, 1994

[51] Int. Cl.⁶ .................... G02B 5/08; G02B 7/182; B60R 1/06; B60R 1/08
[52] U.S. Cl. .................... 359/864; 359/865; 359/872; 248/477
[58] Field of Search .......... 359/862, 864, 865, 866, 359/872; 248/467, 476, 477

[56] References Cited

U.S. PATENT DOCUMENTS

| 2,764,913 | 10/1956 | Green | 359/855 |
| 4,526,446 | 7/1985 | Adams | 359/865 |
| 4,629,296 | 12/1986 | White | 359/865 |
| 4,932,769 | 6/1990 | Goosen | 359/865 |
| 5,044,739 | 9/1991 | do Espirito Santo | 359/866 |

FOREIGN PATENT DOCUMENTS 320231 10/1929 United Kingdom ............ 248/477

Primary Examiner—Ricky D. Shafer

[57] ABSTRACT

An auxiliary mirror device is for securing to a rear view mirror of a vehicle, and includes a base secured to the rear view mirror and a housing rotatable relative to the base. The housing includes a tapered portion for engaging with an optical reflecting member which includes an angular position that may be adjusted relative to the base when the housing is rotated relative to the base. The housing includes a tooth for engaging with a number of teeth formed in the base so as to position the housing relative to the base.

3 Claims, 8 Drawing Sheets

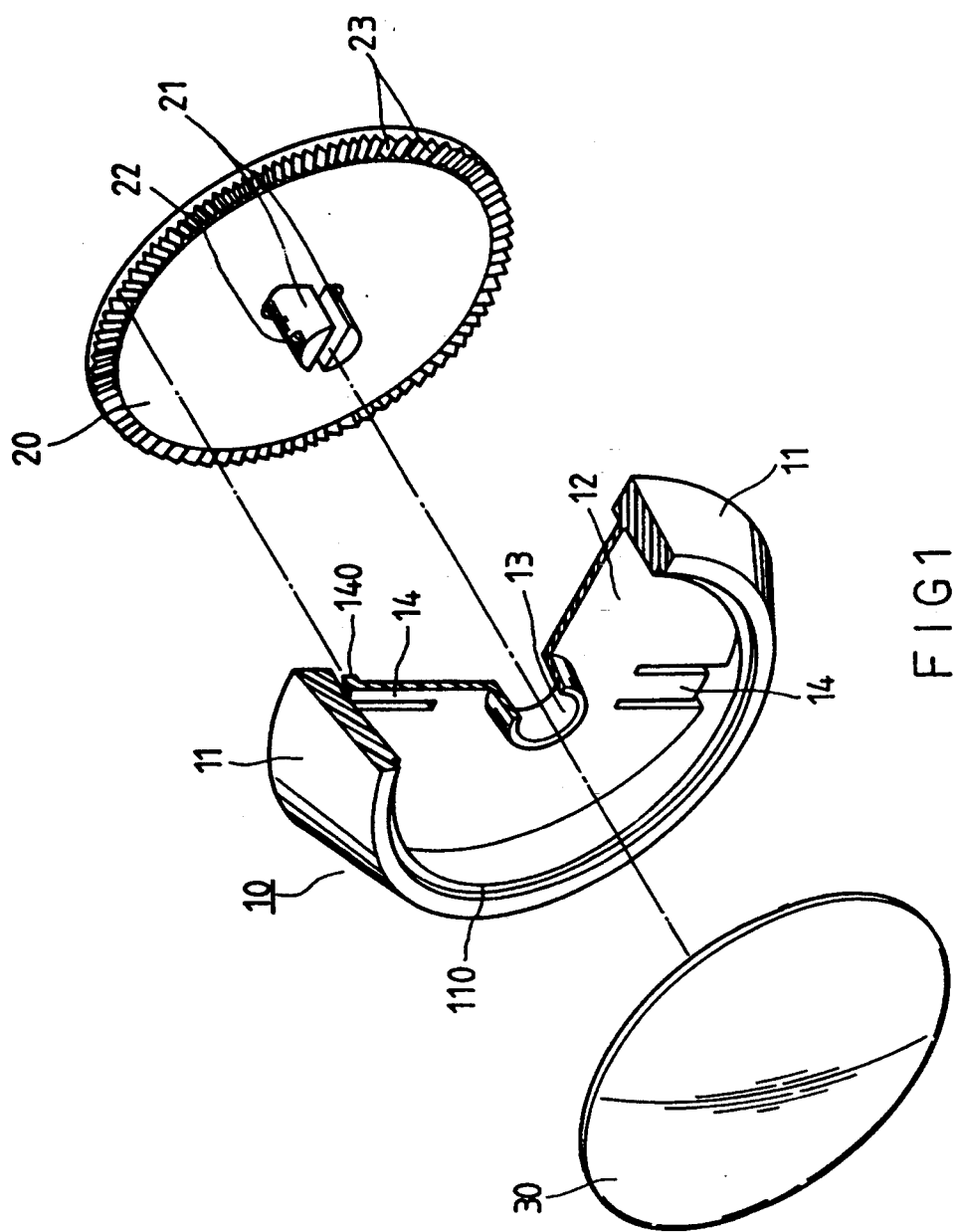

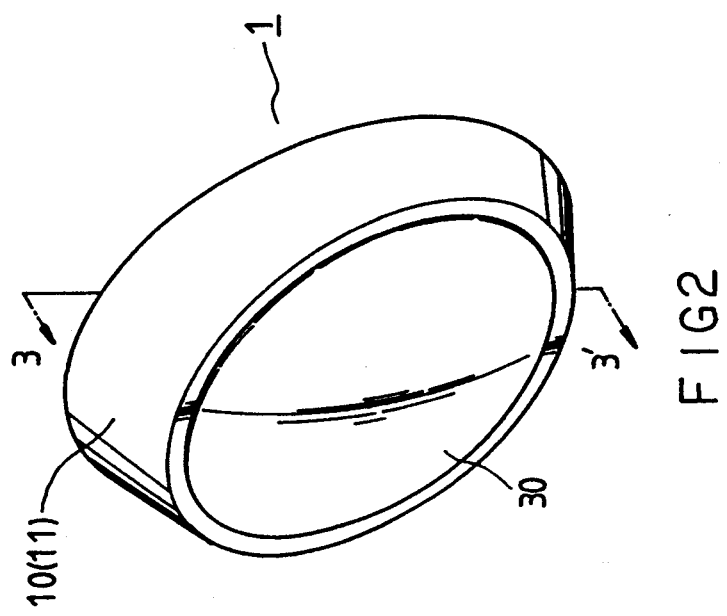

AUXILIARY MIRROR ASSEMBLY FOR REAR VIEW MIRROR

BACKGROUND OF THE INVENTION

1. Field of the Invention

The present invention relates to an auxiliary mirror, and more particularly to an auxiliary mirror assembly for rear view mirror.

2. Description of the Prior Art

A typical auxiliary mirror for rear view mirror is disclosed in U.S. Pat No. 4,311,363 to Marsalka et al. and comprises an optical reflecting element assembled in a support housing. However, the auxiliary mirror is simply attached to the rear view mirror. The angular position of the auxiliary mirror may not be adjusted.

The present invention has arisen to mitigate and/or obviate the afore-described disadvantages of the conventional auxiliary mirrors.

SUMMARY OF THE INVENTION

The primary objective of the present invention is to provide an auxiliary mirror assembly for a rear view mirror in which the auxiliary mirror may be adjusted relative to the rear view mirror.

In accordance with one aspect of the invention, there is provided an auxiliary mirror assembly comprising a base for securing to a rear view mirror, the base including a plurality of first teeth formed therein; a housing rotatably secured to the base and including at least one second tooth formed thereon for engaging with the first teeth so as to position the housing relative to the base, the housing including a tapered portion distal to the base; and an optical reflecting member secured to the tapered portion of the housing, and the optical reflecting member being adjusted relative to the base when the housing is rotated relative to the base.

The housing includes a bottom surface having a hub formed therein, the base includes a pair of shafts extended therefrom for engaging with the hub of the housing so as to be secured to the housing. The shafts include a stop means for engaging with the hub so as to retain the shafts to the hub. The bottom surface includes at least one positioning arm formed therein, the second tooth is formed on the positioning arm for engaging with the first teeth of the base.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is an exploded view of an auxiliary mirror assembly in accordance with the present invention;

FIG. 2 is a perspective view of the auxiliary mirror assembly;

DETAILED DESCRIPTION OF THE PREFERRED EMBODIMENT

Figure 10:
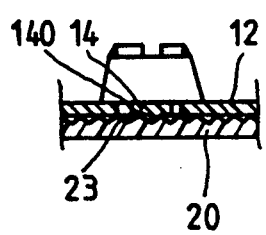
FIGS. 10 and 11 are cross sectional views taken along lines 10-10' and 11-11' of FIGS. 3 and 4 respectively.
Figure 3:
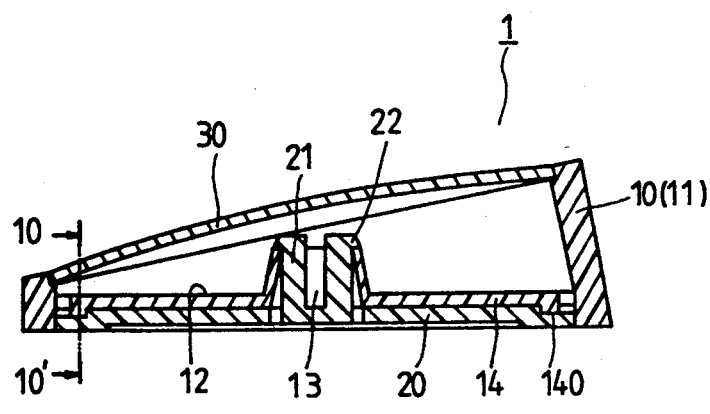
FIGS. 3 and 4 are cross sectional views taken along lines 3-3' of FIG. 2.
Figure 11:
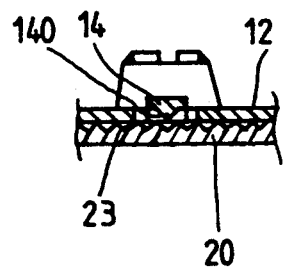
Figure 4:
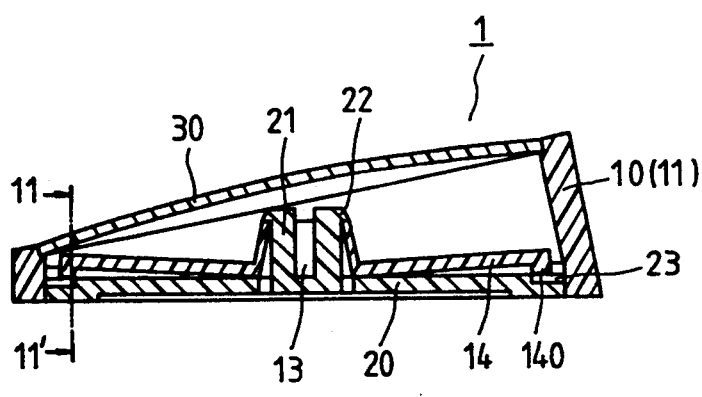

Referring to the drawings, and initially to FIGS. 1 to 3, an auxiliary mirror assembly in accordance with the present invention is generally designated with reference numeral "1" and comprises a housing 10 defined by a peripheral wall 11 which includes a tapered upper portion having an annular shoulder 110 formed therein for engaging with an optical reflecting member 30, best shown in FIGS. 3 and 4. The housing 10 includes a bottom surface 12 having a hub 13 formed in the center and having a pair of positioning arms 14 oppositely formed therein. Each of the positioning arms 14 includes a free end having a tooth 140 formed thereon.

A base 20 includes a bifurcated axle or a pair of shafts 21 for engaging in the hub 13 of the housing 10. The shafts 21 each includes a stop means 22 formed in the free end for engaging with the hub 13 so as to secure the base 20 to the housing 10. The base 20 includes a plurality of teeth 23 formed in the peripheral portion for engaging with the teeth 140 of the positioning arm 14.

In operation, as shown in FIGS. 3, 4 and 10, 11, when the housing 10 is rotated relative to the base 20, the teeth 140 of the positioning arms 14 may engage with the teeth 23 of the base 20 so as to position the housing 10 relative to the base 20. It is to be noted that the optical reflecting member 30 is inclined relative to the base 20 such that the angular position of the optical reflecting member 30 may be adjusted relative to the base 20 when the housing 10 is rotated relative to the base 20.

Figure 5:
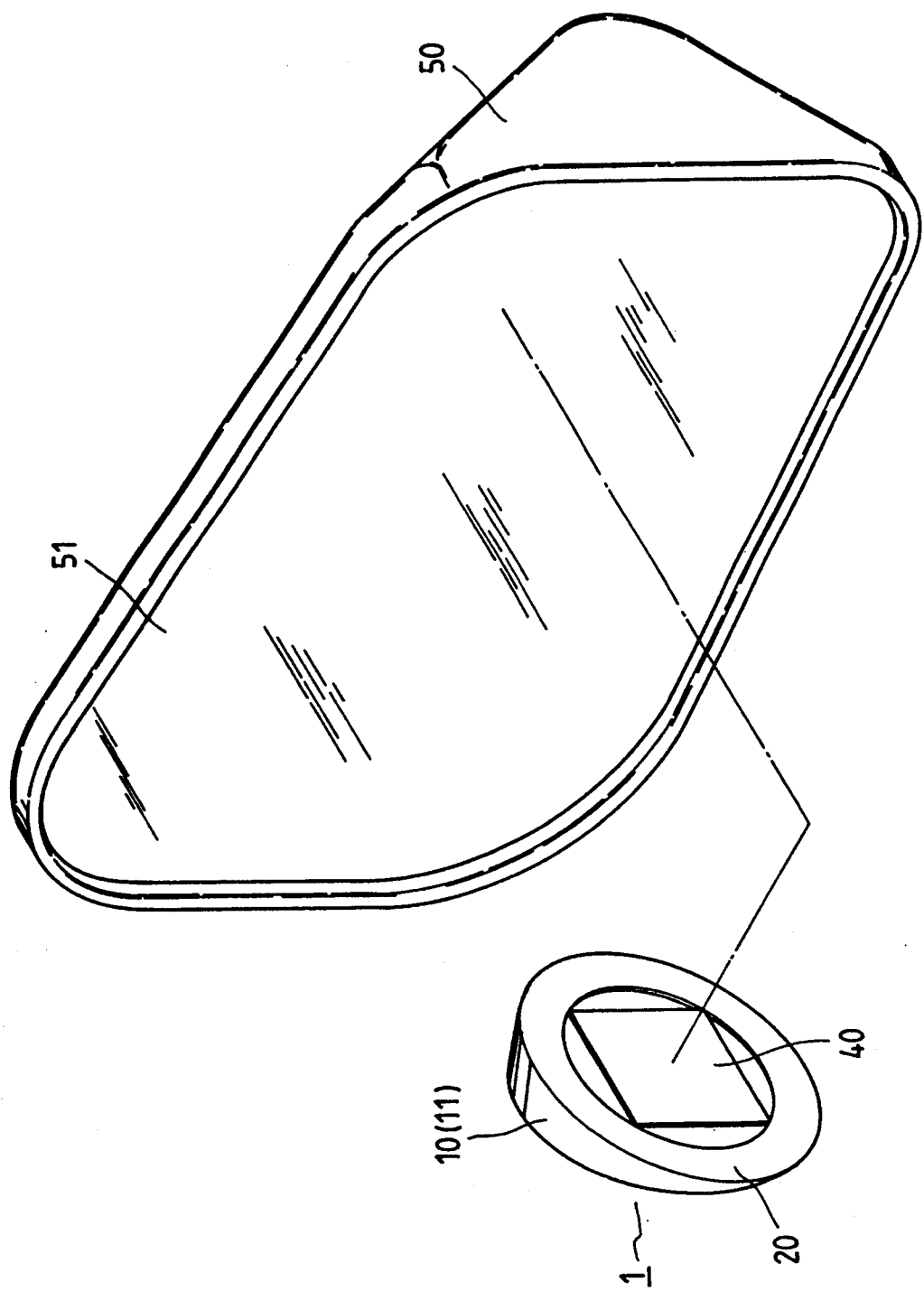
FIG. 5 is an exploded view illustrating the attachment of the auxiliary mirror assembly to a rear view mirror.
Figure 6:
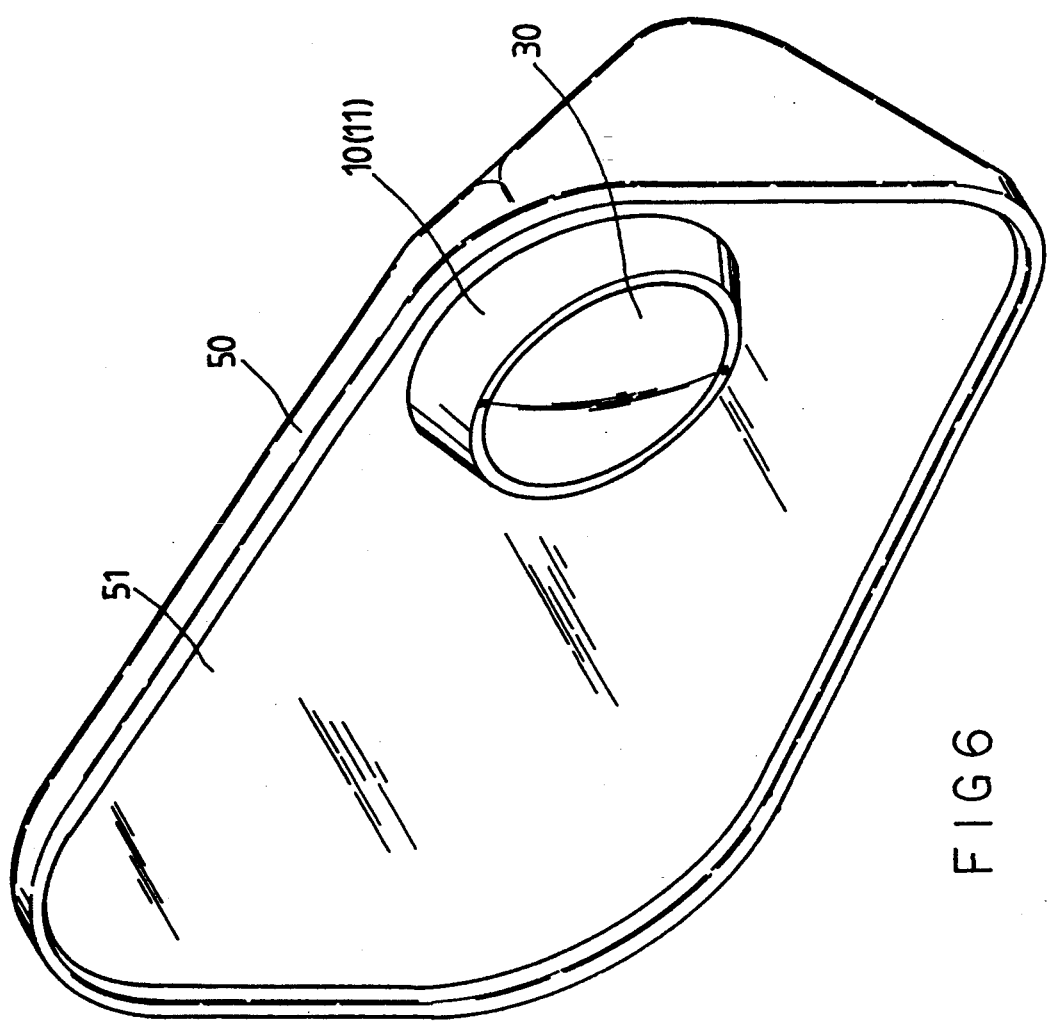
FIG. 6 is a perspective view illustrating the attachment of the auxiliary mirror assembly to a rear view mirror.

Referring next to FIGS. 5 and 6, the auxiliary mirror assembly 1 may be secured to the optical reflecting member 51 of a rear view mirror 50 with adhesive material 40. The housing 10 may also be rotated relative to the base 20.

Figure 7:
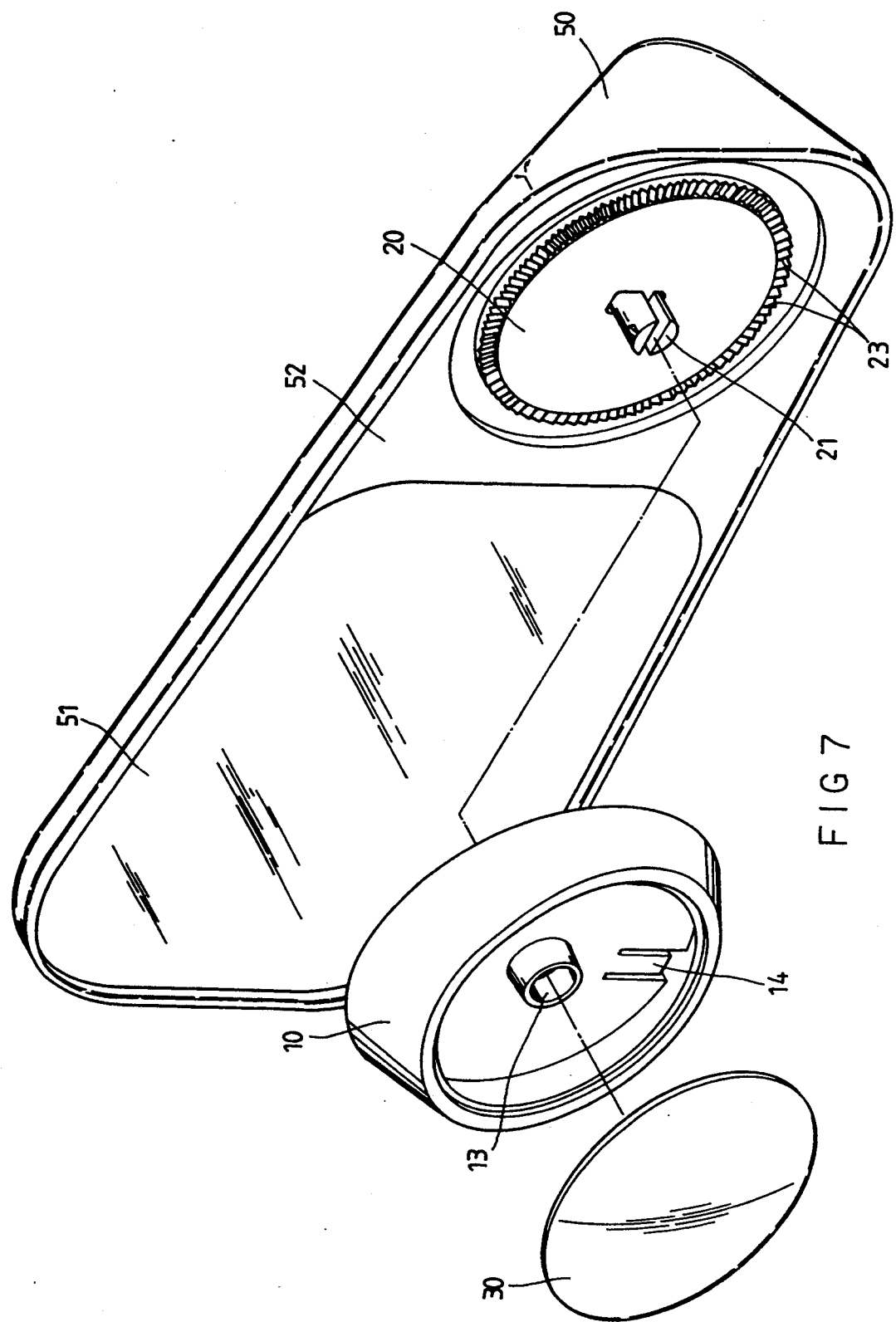
FIG. 7 is an exploded view showing another application of the auxiliary mirror assembly in accordance with the present invention.
Figure 8:
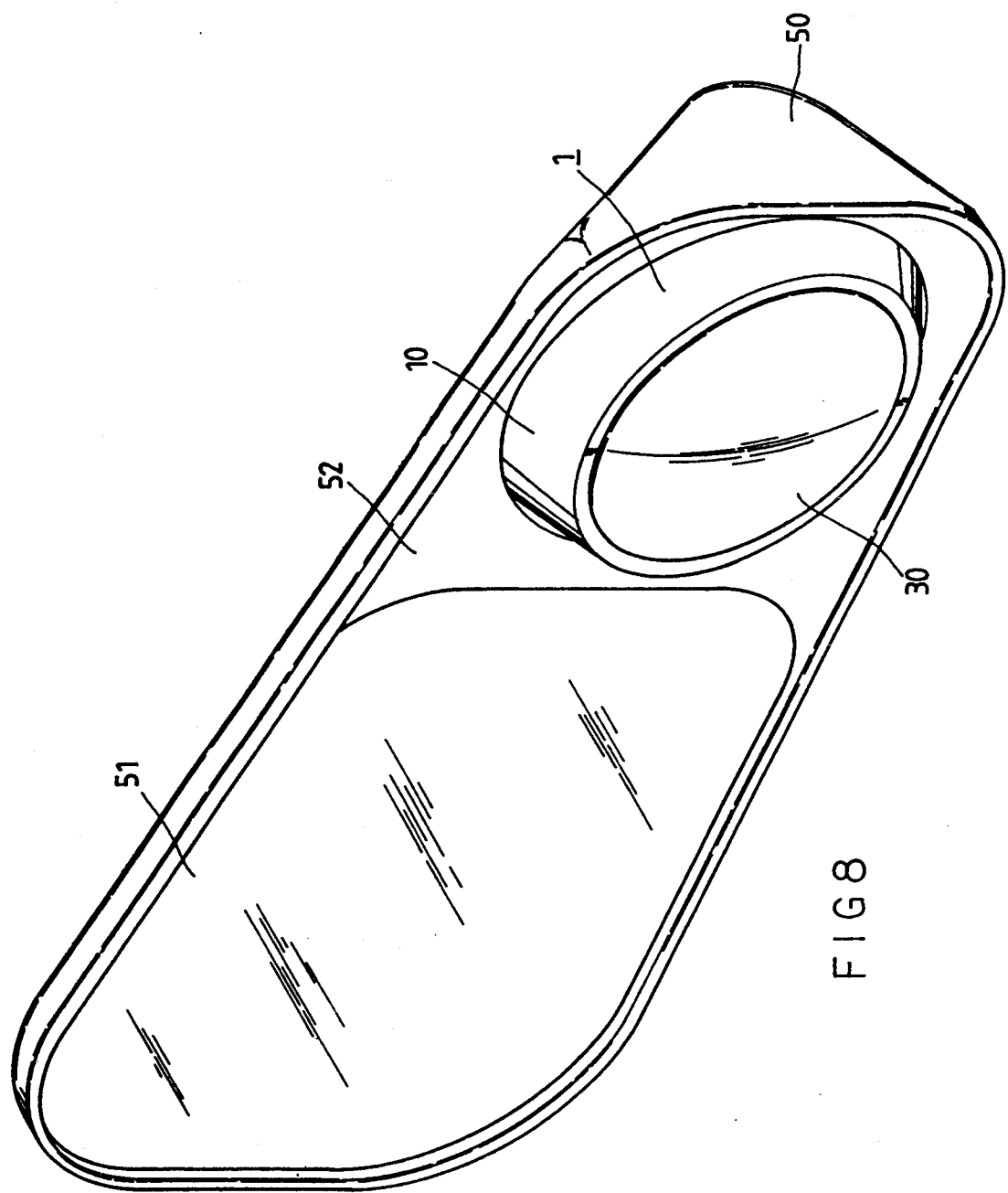
FIGS. 8 and 9 are perspective views illustrating the attachment of the auxiliary mirror assembly to the rear view mirror.
Figure 9:
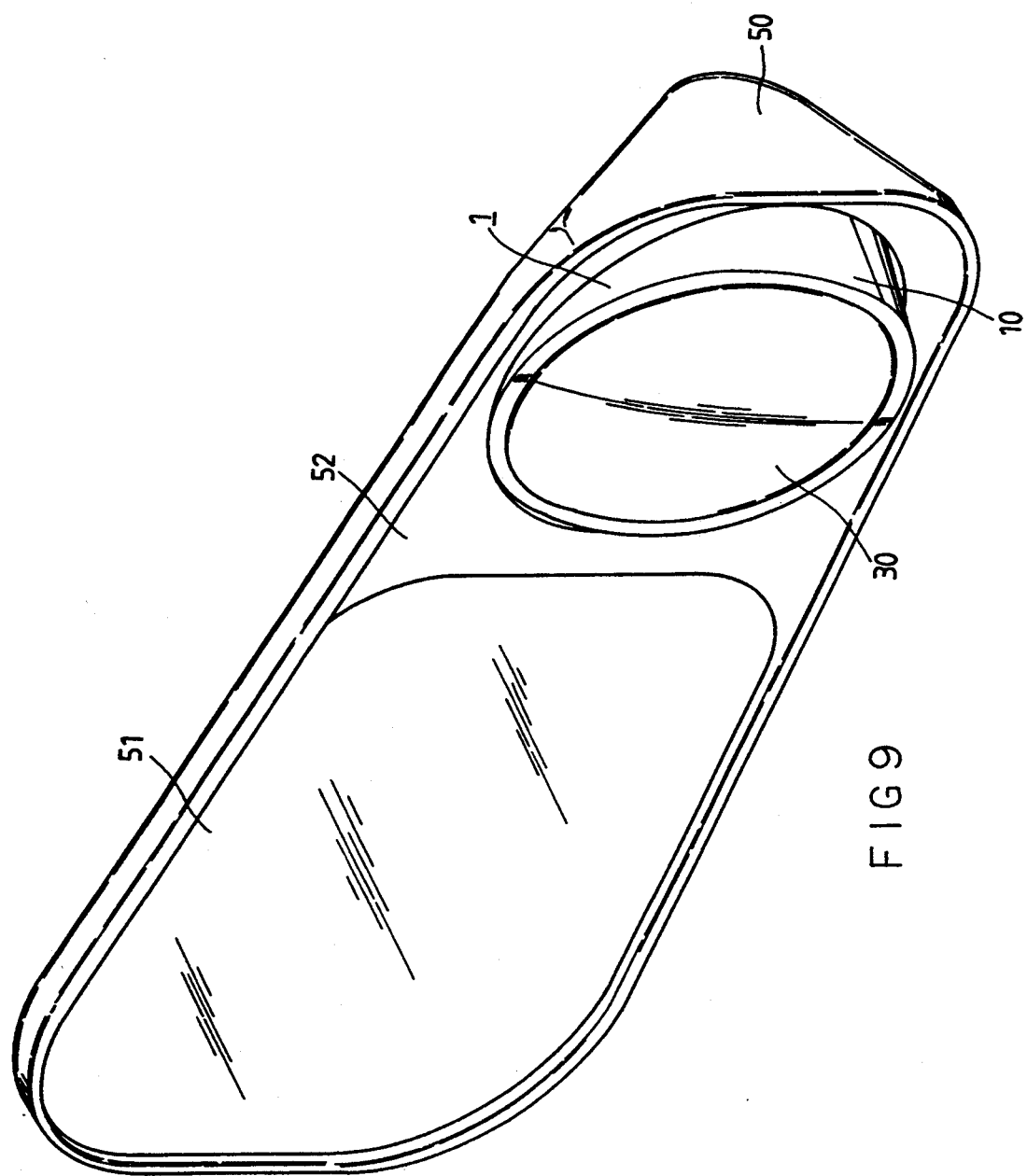

Alternatively, please refer to FIGS. 7-9, the rear view mirror 50 may includes a board 52 provided therein and the base 20 may be directly provided or formed in the board 52. The angular position of the optical reflecting member 30 may also be adjusted by rotating the housing 10 relative to the base 20.

Accordingly, the auxiliary mirror assembly in accordance with the present invention includes an optical reflecting member 30 having an angular position that may be adjusted.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An auxiliary mirror comprising:
a base for securing to a rear view mirror, said base including a plurality of first teeth formed therein and a pair of shafts;
a housing rotatably secured to said base and including at least one second tooth formed thereon for engaging with said first teeth so as to position said housing relative to said base, said housing including a bottom surface having a hub formed therein, said pair of shafts being engaged with said hub of said housing so as to be secured to said housing, and a tapered portion distal to said base; and an optical reflecting member secured to said tapered portion of said housing, and said optical reflecting member being adjusted relative to said base when said housing is rotated relative to said base.

2. An auxiliary mirror according to claim 1, wherein said shafts include a stop means for engaging with said hub so as to retain said shafts to said hub.

3. An auxiliary mirror according to claim 1, wherein said bottom surface of said housing includes at least one positioning arm formed therein, said second tooth is formed on said positioning arm for engaging with said first teeth of said base.

* * * * *